US005089054A

United States Patent [19]

Sievers

[11] Patent Number: 5,089,054

[45] Date of Patent: Feb. 18, 1992

[54] FLAT PLATE ALKALI METAL THERMOELECTRIC CONVERTER MODULE

[75] Inventor: Robert K. Sievers, Irwin, Pa.

[73] Assignee: Westinghouse Electric Corp., Pittsburgh, Pa.

[21] Appl. No.: 619,354

[22] Filed: Nov. 28, 1990

[51] Int. Cl.$^5$ ............................................. H01L 37/00
[52] U.S. Cl. ................................... 136/202; 136/205; 136/200; 429/5; 429/120; 429/104
[58] Field of Search ...................... 136/205, 200, 202; 429/5, 11, 50, 104, 112, 120

[56] References Cited

U.S. PATENT DOCUMENTS

| | | | |
|---|---|---|---|
| 3,811,943 | 5/1974 | Minck et al. | 136/6 FS |
| 4,395,432 | 7/1983 | Rizzelli | 427/34 |
| 4,505,991 | 3/1985 | Weber | 429/11 |
| 4,510,210 | 4/1985 | Hunt | 429/11 |
| 4,808,240 | 2/1989 | Sievers | 136/202 |
| 4,857,421 | 8/1989 | Ernst | 429/104 |
| 4,868,072 | 9/1989 | Abbin et al. | 429/11 |

OTHER PUBLICATIONS

Cole T. (1983) "Thermoelectric Energy Conversion with Solid Electrolytes", *Science*, 221 (4614) 915-920.

Weber, N. (1974) "A Thermoelectric Device Based on Beta-Alumina", *Energy Conversion*, 14:1-8.

Sievers, R. K., and C. P. Bankston (1988) "Radioisotope Powered Alkali Metal Thermoelectric Converter Design for Space Systems", *Proc. 23rd Intersociety Energy Conversion Engineering Conference*, vol. 3, American Society of Mechnical Engineers, Denver, Colo., pp. 159-167.

Sievers, R. K., R. M. Williams, M. L. Underwood, B. Jeffries-Nakamura, and C. P. Bankston (1990) "AMTEC System Performance Studies Using the Detailed Electrode Kinetic and Transport Model", to be published in *Space Nuclear Power Systems 1989*, M. S. El-Genk and M. D. Hoover, eds., Orbit Book Co., Malabar, Fla.

Primary Examiner—Brooks H. Hunt
Assistant Examiner—Chrisman D. Carroll
Attorney, Agent, or Firm—Fred J. Baehr, Jr.

[57] ABSTRACT

A flat plate alkali metal thermoelectric converter module having a plurality of generally flat plate cells grouped in stacks that are electrically connected in series within the stack, the cells being disposed to minimize the heat energy radiated to a condenser to provide a high efficiency module.

19 Claims, 4 Drawing Sheets

FLAT PLATE ALKALI METAL THERMOELECTRIC CONVERTER MODULE

CROSS REFERENCE TO RELATED APPLICATIONS

This application is related to a co-pending application entitled "High Performance Thin Film Alkali Metal Thermoelectric Device" Ser. No. 437878, filed Nov. 17, 1989, and now abandoned.

BACKGROUND OF THE INVENTION

The invention relates to an alkali metal thermoelectric conversion (AMTEC) device and more particularly to a flat plate module made up of a plurality of flat plate cells.

Alkali metal thermoelectric conversion devices convert heat directly to electrical energy, using a beta-alumina solid electrolyte member that will conduct sodium ions, but not electrons. This electrolyte member forms a boundary between high and low pressure sodium filled regions. The temperature in the region of the electrolyte is elevated so that the corresponding saturation pressure is greater than the low pressure region. Under these conditions a chemical potential is developed across the electrolyte that drives sodium ions from the high to the low pressure side along ion conduction planes in the crystal lattice. A charge or potential difference is thereby developed across the electrolyte by the positive ions emerging on the low pressure side and excess electrons, released when the neutral sodium ionized, accumulating on the high pressure side.

Electron conduction layers, that allow the passage of sodium to the surface of the electrolyte, are located on both sides of the electrolyte. These conduction layers are connected through a load and allow the excess electrons accumulating on the high pressure side to move to the low pressure side where they recombine with the excess sodium ions, and in the process perform electrical work on the load. The sodium ion that has passed through the electrolyte and recombined with an electron on the low pressure side, evaporates form the electrolyte surface and is then condensed, collected and pumped back to the high pressure side. Thermal energy is added to the system to replace the generated electrical energy and any heat rejection from the device. U.S. Pat. No. 4,808,240 granted to the inventor describes a stacked vapor fed AMTEC module that operates on the principle described herebefore.

SUMMARY OF THE INVENTION

Among the objects of the invention may be noted the provision of an alkali metal thermoelectric conversion device in which each module is composed of a large number of rugged flat plate cells that can be packed in a space efficient manner that significantly reduces parasitic heat losses, in which the cells can be utilized in both terrestrial and space application and in which the cells are easily connected in series to minimize ohmic losses.

In general, a flat plate alkali metal thermoelectric converter module, when made in accordance with this invention, comprises a plurality of cells, a condenser, heating conduits for heating each cell and a quantity of alkali metal disposed within an enclosure. Each cell has a bed plate, means for containing alkali metal within the bed plate, and an alkali metal and electron barrier capable of conducting alkali metal ions. The barrier cooperates with the bed plate to form the alkali metal containing means. Insulation is disposed to electrically isolate adjacent bed plates. The module also comprises means for transferring liquid alkali metal from the condenser to the alkali metal containing means of each bed plate and a current collector disposed on the barrier to collect electrical energy produced by each cell.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

DESCRIPTION OF THE PREFERRED EMBODIMENT

Figure 1:
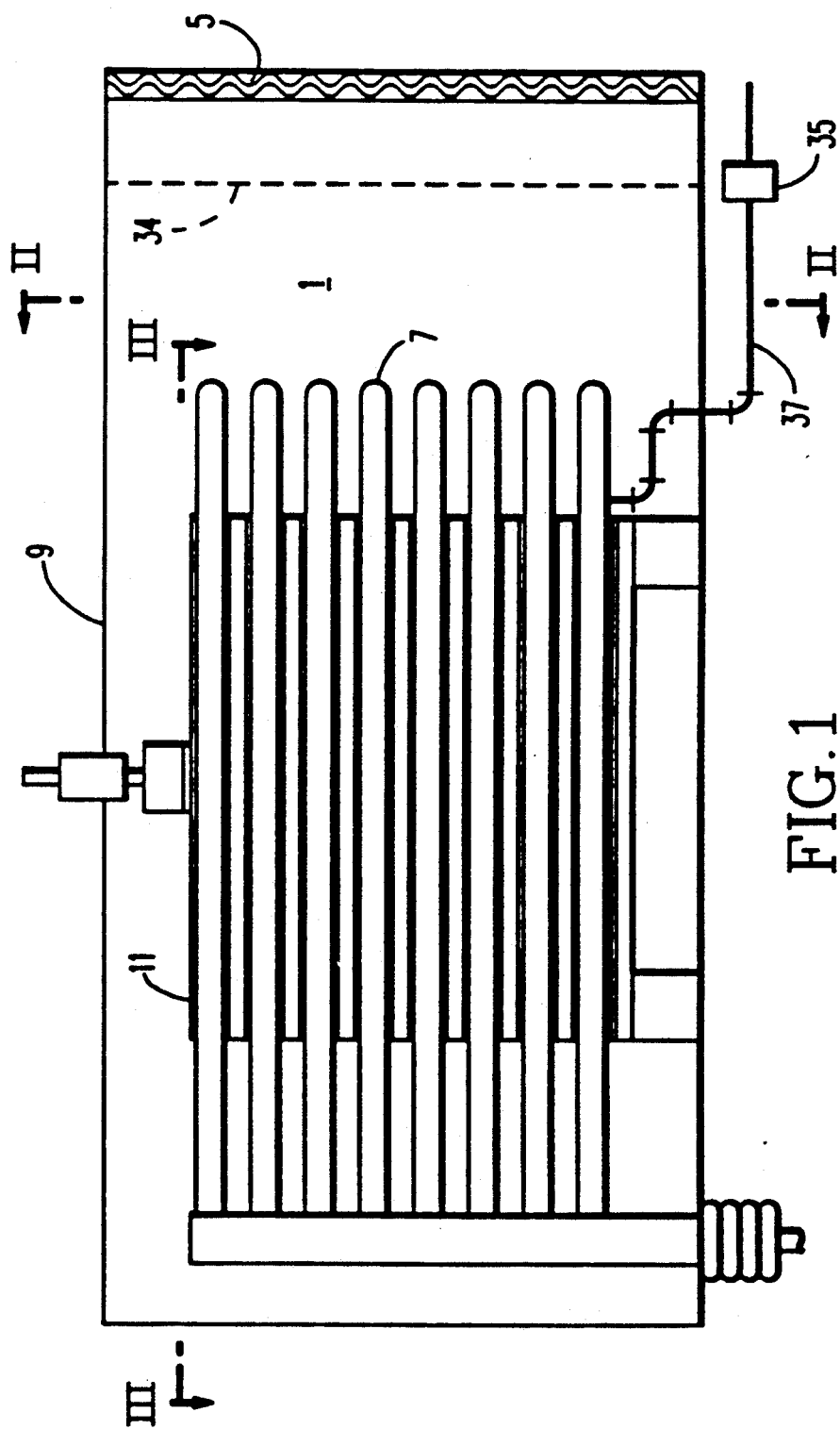
FIG. 1 is a sectional view of a module made in accordance with this invention.
Figure 2:
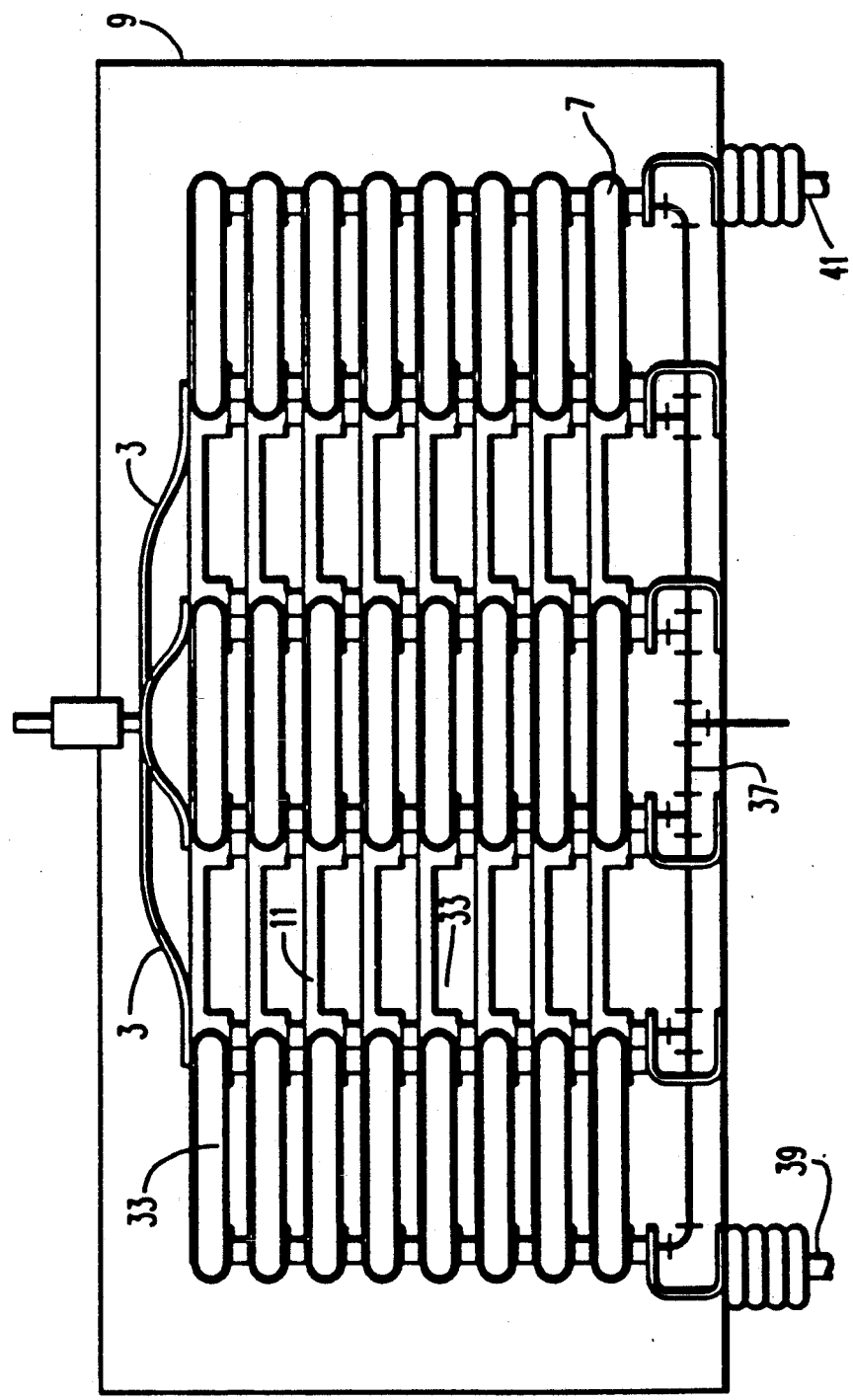
FIG. 2 is a sectional view taken on line II—II of FIG. 1.
Figure 3:
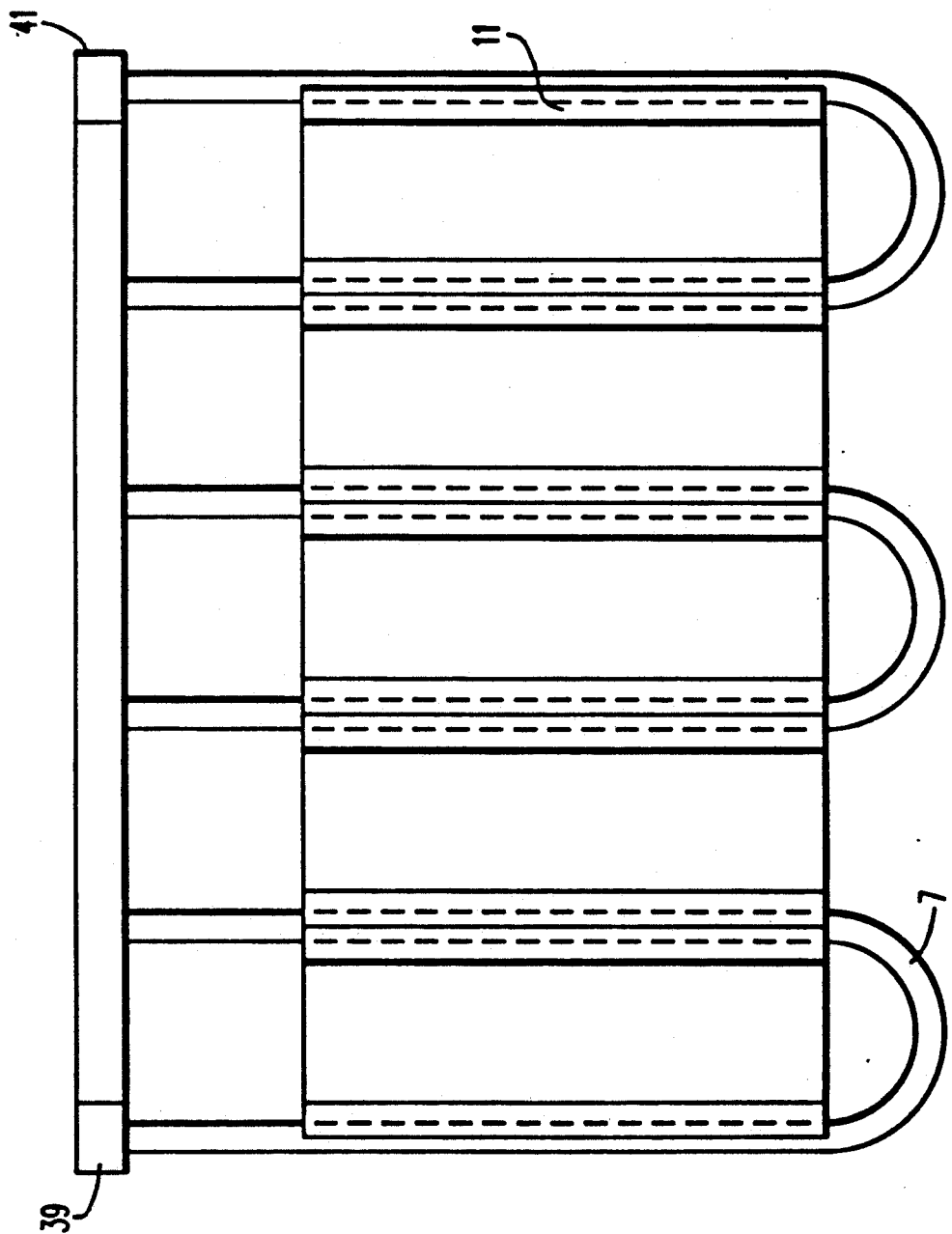
FIG. 3 is a sectional view taken on line III—III of FIG. 2.
Figure 4:
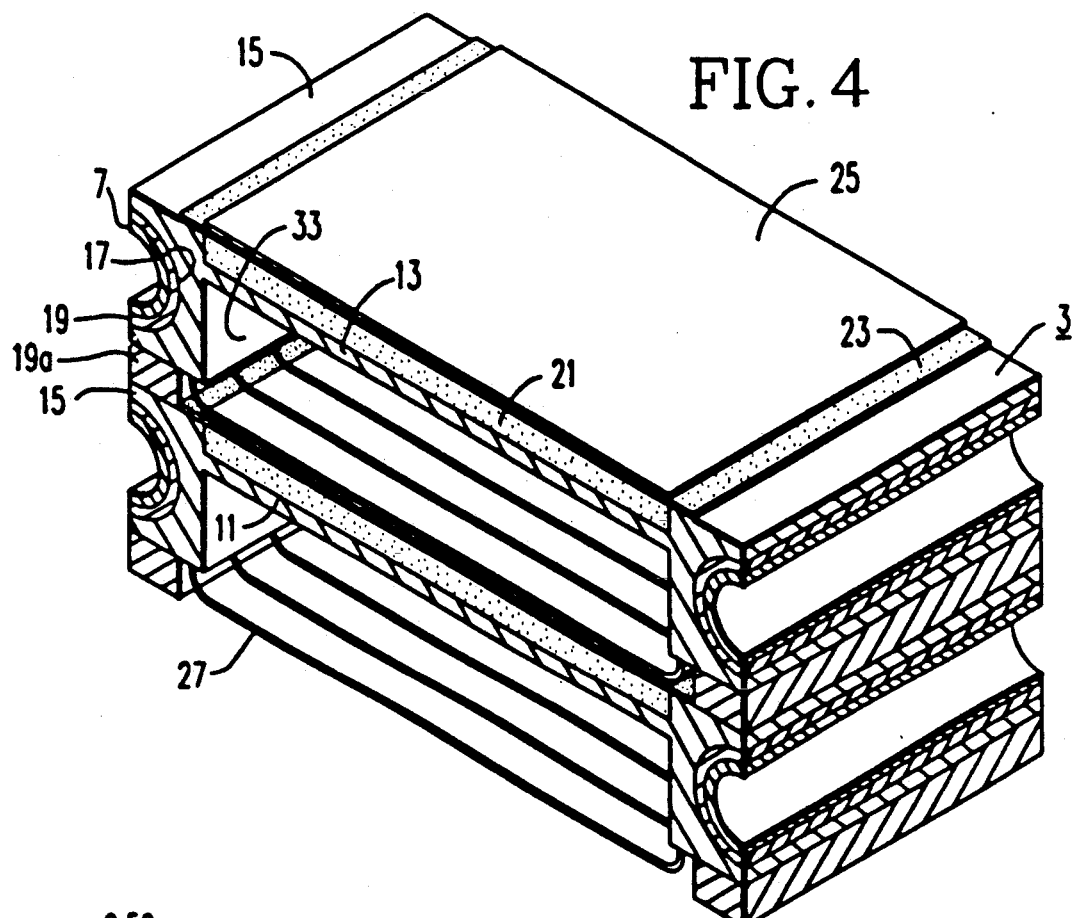
FIG. 4 is an enlarged isometric view of a pair of cells.

Referring now to the drawings in detail and in particular to FIGS. 1 through 4 there is shown a flat plate alkali metal thermoelectric converter module 1 comprising a plurality of cells 3, a sodium vapor condenser 5, a plurality of U shaped heating conduits 7 and a quantity of liquid sodium or other alkali metal (not shown) disposed in a closed vessel or enclosure 9.

The cells 3 comprise a bed plate 11 made of niobium or tantalum and having a central plate like portion 13 disposed between a pair of thick edges 15. The central plate like portion 13 may be flat or have one or more extended surfaces, such as being corrugated, ridged or having other types of undulations for increasing the surface area of at least the upper surface thereof. The thick edges 15 have a generally rectangular shaped cross section and at least one C shaped groove 17 for receiving the heating conduit 7. A ceramic insulator 19 such as alpha-alumina, which readily conducts heat, but not electrons is disposed between the heater conduit 7 and the C shaped grooves 17 to electrically isolate each cell. The central plate like portion 13 is shown disposed closer to the upper edge of the thick edges 15 forming a channel for receiving a sintered niobium matrix or wick 21 for liquid alkali metal. The wick 21 is packed and sintered in the bed plate 11 providing a simple support structure resistant to pressure forces. The wick 21 may be flat or have at least the outer surface an extended surface. A thin layer or film of beta-alumina overlays the outer surface of the sintered niobium wick 21 forming an electrolyte or barrier 23 which conducts alkali metal ions, but not electrons and is impervious to liquid metal. Thus, the bed plate 11, the sintered niobium wick 21 and the beta-alumina barrier 23 cooperate to from a simple effective pressure supportive means for containing liquid alkali metal adjacent the bed plate 11. A thin film of tungsten-rhodium is applied over the beta-alumina barrier 23 by sputter deposition or other process to form an electrode 25 and cooperates with a plurality of tungsten springs 27 to form a current collector.

The beta-alumina barrier 23, if extended over the top portion of the thick edges 15 or separate ceramic insulation strips 2 19a disposed between adjacent bed plates 11 cooperate with the ceramic insulators 19 between the heater conduits 7 and the bed plates 11 to electrically isolate adjacent cells 3.

Groups of the cells 3 stacked on top of one another are connected electrically in series by the current collectors made up of the electrodes 25 and springs 27. Leads (not shown) electrically connect the groups of cells in parallel.

When stacked in groups the cells 3 are so disposed that a channel or duct 33 is formed between adjacent cells 3.

The condenser 5 is disposed on one side of the vessel 9 and is shielded from heat radiated from the cells 3 and heat conduits 5 by a radiation shield 34.

A liquid metal pump 35 and associated piping 37 cooperate to provide means for transferring liquid alkali metal from the condenser 5 to the wicks 21.

The operation of the flat plate alkali metal thermoelectric converter module 1 requires that heat be added via the heater conduits 7 which raises the temperature of the cells 3 to about 1200° K. and that heat be removed via the condenser 5 which operates at about 600° K. creating a differential pressure across the electrolyte or beta-alumina barrier 23. Liquid alkali metal at approximately 200,000 Pa fills the porous wick 21, while the vapor space on the other side of the electrode or beta-alumina barrier 23 is approximately 5 to 100 Pa. The hotter liquid alkali metal in the wick 21 ionizes moving into the ion conduction planes of the beta-alumina 23. Electrons freed by the ionized alkali metal move through the bed plate 11, into the tungsten springs 27 and electrodes 25 of the adjacent cell 3 where they recombine with the emerging alkali metal ions producing an electrical potential of about 0.5 to 1.5 volts across the cells 3. The reformed alkali metal atoms vaporize and flow into the ducts 33 and from the ducts 33 into the vessel 9 and then to the condenser 5 where they are condensed and collected in another wicking structure (not shown in detail) and returned to the wicks 21 via the pump 35 and associated piping forming a closed path for the electrolytic process.

Five sides of the vessel 9 are thermally insulated as are heater supply and return plenums 39 and 41 which assist in keeping parasitic heat losses to a minimum.

Figure 5:
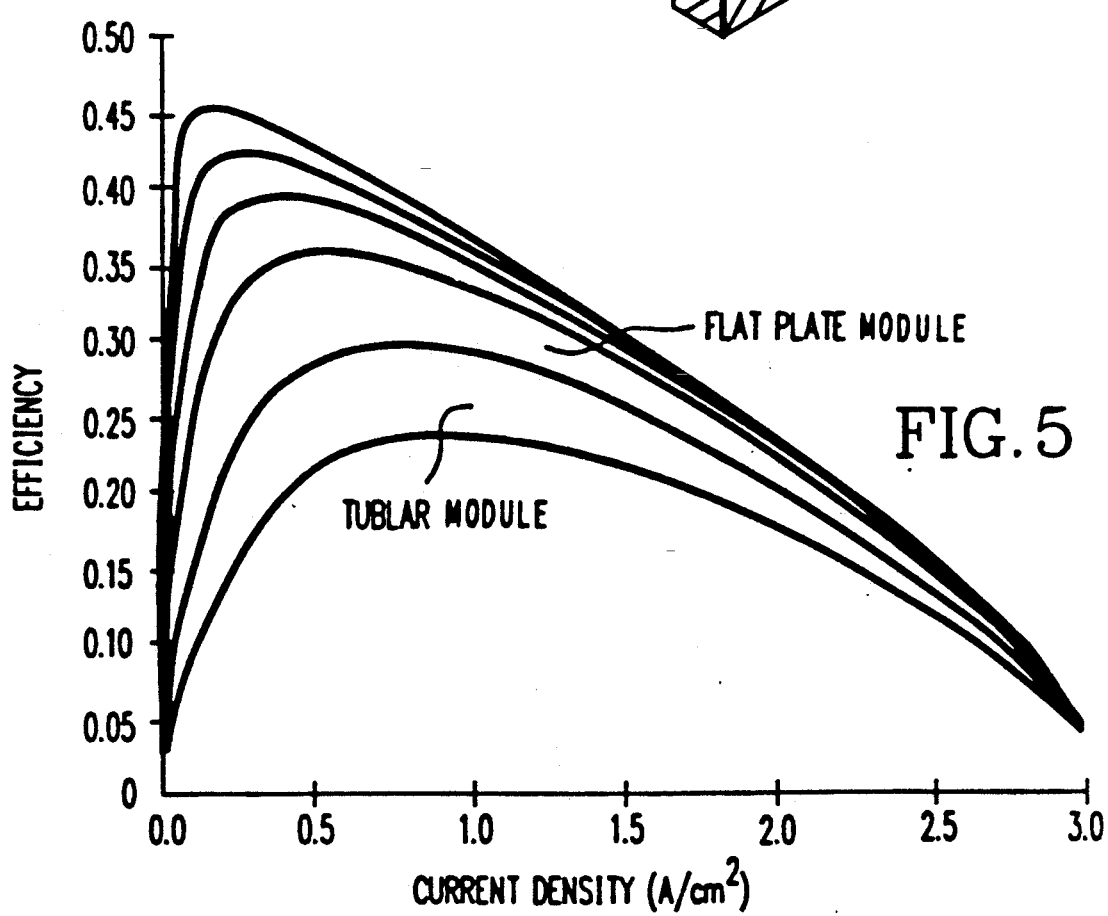
FIG. 5 is series of curves showing efficiency verses current density.

FIG. 5 shows the efficiency of the flat plate module 1 in comparison to the tubular modules previously made.

The flat plate modules 1 described herein advantageously allow very close packing of the electrolyte with a simple liquid feed system, volumetric power densities higher than tubular configurations, and simple electrical series connection of cells in a zero gravity environment.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that the claims are intended to cover such modifications and adaptations as they are considered to be within the spirit and scope of this invention.

What is claimed is:

1. A flat plate alkali metal thermo-electric converter module comprising an enclosure; a plurality of cells, a condenser, heating conduits for heating each cell and a quantity of alkali metal disposed within said enclosure; each cell having a bed plate with a generally flat portion, means for containing alkali metal adjacent the generally flat portion of the bed plate, and an alkali metal and electron barrier capable of conducting alkali metal ions; the barrier cooperating with the generally flat portion of the bed plate to form the alkali metal containing means adjacent each generally flat portion of the bed plate; each bed plate cooperating with an adjacent bed plate to form a duct for transporting vaporized alkali metal to the condenser; insulation disposed to electrically isolate adjacent bed plates; means for transferring liquid alkali metal from the condenser to the alkali metal containing means and a current collector disposed in electrical contact with the barrier to collect electrical energy produced by each cell.

2. The module of claim 1, wherein the bed plate has a groove on opposite sides thereof forming heat transfer channels for adding heat energy to the modules.

3. The module of claim 1, wherein the bed plate comprises a central generally flat portion with a pair of thick edges disposed on opposing sides of the generally flat portion and at least one C shaped groove in each of the thick edges.

4. The module of claim 3, wherein the heating conduit is disposed in the C shaped grooves.

5. The module of claim 4 comprising electrical insulation disposed between the conduit and the C shaped grooves.

6. The module of claim 6, wherein the C shaped grooves are disposed in the outboard sides of the thick edges.

7. The module of claim 1, wherein the alkali metal containing means comprises a porous matrix forming a wick for distributing alkali metal to one side of the barrier and for forming a support for the barrier.

8. The module of claim 7, wherein the alkali metal containing means is made of porous sintered niobium.

9. The module of claim 7, wherein the wick has at least one extended surface.

10. The module of claim 1, wherein the current collectors are disposed to connect groups of the cells in a series circuit.

11. The module of claim 7, wherein the current collectors comprise a thin film of tungsten-rhodium overlaying the barrier and tungsten springs electrically connecting the thin film of tungsten-rhodium of one cell to the base plate of an adjacent cell to electrically connect the groups of cells in series.

12. The module of claim 1, wherein the groups of the series connected cells are electrically connected in parallel.

13. The module of claim 1, wherein the barrier is made of beta-alumina.

14. The module of claim 1, wherein the insulation is alpha-alumina.

15. The module of claim 1, wherein the bed plate is made of niobium or tantalum.

16. The module of claim 1, wherein the alkali metal is sodium.

17. The module of claim wherein the enclosure is thermally insulated except for the portion adjacent the condenser.

18. The module of claim 1, wherein the central generally flat portion of the bed plate has at least one extended surface.

19. The module of claim 17, where in the generally flat portion of the bed plate has two extended surfaces.

* * * * *